(12) United States Patent
Wu et al.

(10) Patent No.: US 9,740,858 B1
(45) Date of Patent: Aug. 22, 2017

(54) SYSTEM AND METHOD FOR IDENTIFYING FORGED EMAILS

(71) Applicant: Trend Micro Incorporated, Tokyo (JP)

(72) Inventors: Cheng-Han Wu, Taipei (TW); Shih-Wei Lu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 16 days.

(21) Appl. No.: 14/798,852

(22) Filed: Jul. 14, 2015

(51) Int. Cl.
*G06F 21/00* (2013.01)
*G06F 21/55* (2013.01)
*G06F 21/56* (2013.01)

(52) U.S. Cl.
CPC .......... *G06F 21/552* (2013.01); *G06F 21/563* (2013.01); *G06F 21/566* (2013.01)

(58) Field of Classification Search
None
See application file for complete search history.

(56) References Cited

U.S. PATENT DOCUMENTS

| | | | | |
|---|---|---|---|---|
| 8,458,261 | B1* | 6/2013 | Liao | H04L 51/28 709/206 |
| 9,230,280 | B1* | 1/2016 | Maag | G06Q 40/00 |
| 2006/0047766 | A1* | 3/2006 | Spadea, III | H04L 51/12 709/206 |
| 2006/0101334 | A1* | 5/2006 | Liao | G06F 17/2264 715/205 |
| 2007/0056035 | A1* | 3/2007 | Copley | G06F 21/566 726/22 |
| 2008/0034432 | A1* | 2/2008 | Bohannon | G06Q 20/3674 726/23 |
| 2008/0147857 | A1* | 6/2008 | Oliver | H04L 12/585 709/224 |
| 2009/0089426 | A1* | 4/2009 | Yamasaki | H04L 29/12066 709/225 |
| 2010/0161734 | A1* | 6/2010 | Wang | H04L 51/28 709/206 |
| 2015/0237061 | A1* | 8/2015 | Shraim | H04L 51/12 726/22 |

OTHER PUBLICATIONS

FireEye—Email Security, EX Series and ETP, 6 sheets (retrieved on Oct. 27, 2015), retrieved from the internet: https://www.fireeye.com/products/ex-email-security-products.html.

(Continued)

*Primary Examiner* — Hadi Armouche
*Assistant Examiner* — Andrew Steinle
(74) *Attorney, Agent, or Firm* — Okamoto & Benedicto LLP

(57) ABSTRACT

Forged emails are detected by extracting email address parts of a sender email address. The email address parts include an account name, a subdomain, and a base domain of the sender email address. The mutation ratio of the email address parts relative to reference strings are calculated to determine similarity of the email address parts to the reference strings. The mutation ratios are compared to ratio thresholds to identify suspicious email addresses, and the results of identifying suspicious email addresses are correlated with other computer security information to identify forged emails.

18 Claims, 15 Drawing Sheets

(56) References Cited

OTHER PUBLICATIONS

Brandprotect—Cyber Threat Intelligence and Brand Protection, 4 sheets (retrieved on Oct. 27, 2015), retrieved from the internet: https://www.brandprotect.com/solutions/threatsmart-cyber-threat-monitoring-and-risk-mitigation/.

Cisco Phishing Overview, 3 sheets (retrieved on Oct. 27, 2015), retrieved from the internet: http://www.cisco.com/c/en/us/products/security/email-security-appliance/phishing_index.html.

\* cited by examiner

| | | | |
|---|---|---|---|
| 20150219000 | 67.69.168.71 | 8:1 | toroondamxzimta02-srv.bellnexxia.net PayPal@intl-paypal.com |
| 20150219000 | 109.123.196.45 | 0:1 | giant01.cust.casablanca.cz newsletter@felixovy-novinky.cz |
| 20150219000 | 216.228.160.141 | 0:1 | mmp0-v0.bendbroadband.net bounce-28_HTML-7893767-43125-6249496-5789@bounce.s.kohls.com |
| 20150219000 | 218.80.192.197 | 0:1 | gateway1.unionpay.com donotreply@service.com |
| 20150219000 | 208.82.104.186 | 0:1 | zino.isoftdata.net webrequest@isoftdata.com |
| 20150219000 | 204.92.31.128 | 0:2 | mail01.response.dell.com bounceback@response.dell.com |
| 20150219000 | 199.255.27.115 | 0:4 | ADSLUSHTCA03.allieddigital.net NIniestra@allieddigital.net |
| 20150219000 | 153.149.180.79 | 0:1 | c15sbfq5.securesites.net c.ching@masumoto-shipping.co.jp |
| 20150219000 | 185.66.248.209 | 0:1,2:2 | emark43.emblueuser.com capacitarte2@emark16.embluejet.com |
| 20150219000 | 67.222.5.182 | 8:7 | host.hintzebros.com hbhosting@host.hintzebros.com |
| 20150219000 | 210.155.36.102 | 0:28 | GBCGWY11.g-book.com,GBCGWY12.g-book.com g-book.info@03-003.mail.g-book.com |
| 20150219000 | 124.39.224.154 | 2:44 | mail.alinez.net azpop@alinez.net |
| 20150219000 | 193.169.180.59 | 2:15 | mail17-59.srv2.de return@mail.innogames.com |
| 20150219000 | 219.166.188.250 | 0:1 | wakos.co.jp sugimoto@wakos.co.jp |
| 20150219000 | 174.143.229.157 | 0:1 | mail07.sm.ihg.com bounces@sm.ihg.com |

FIG. 7

```
20150219000         67.69.168.71        8:1     toroondcmximta02-srv.bellnexxia.net      PayPal@intl-paypal.com
[account] PayPal(paypal):100  [subdomain] (taobao):0  [basedomain] intl-paypal(paypal):90
20150219000     109.123.196.45   0:1    giant01.cust.casablanca.cz        newsletter@felixovy-novinky.cz
[account] newsletter(twitter):59         [subdomain] (taobao):0  [basedomain] felixovy-novinky(fedex):48
20150219000     216.228.160.141  0:1    mmp0-v0.bendbroadband.net         bounce-28_HTML-7893767-43125-6249496-5789@bounce.s.kohls.com
[account] bounce-28_HTML-7893767-43125-6249496-5789(chase):32    [subdomain] bounce.s(payoneer):38    [basedomain] kohls(hsbc):42
20150219000     218.80.192.197  0:1     gateway1.unionpay.com       donotreply@service.com
[account] donotreply(vodafone):44        [subdomain] (taobao):0  [basedomain] service(americanexpress):57
20150219000     208.82.104.186  0:1     zino.isoftdata.net       webrequest@isoftdata.com
[account] webrequest(westpac):47         [subdomain] (taobao):0  [basedomain] isoftdata(microsoft):56
20150219000     204.92.31.128   0:2     mail01.response.dell.com        bounceback@response.dell.com
[account] bounceback(ebay):61    [subdomain] response(americanexpress):59       [basedomain] dell(fedex):42
20150219000     199.255.27.116  0:4     ADSLUSHTCA03.allieddigital.net       NIniestra@allieddigital.net
[account] NIniestra(westpac):50  [subdomain] (taobao):0  [basedomain] allieddigital(linkedin):56
20150219000     153.149.180.79  0:1     c15sbfq5.securesites.net        c.ching@masumoto-shipping.co.jp
[account] c.ching(blockchain):59         [subdomain] (taobao):0  [basedomain] masumoto-shipping(amazon):43
20150219000     185.66.248.209  0:1,2:2 emark43.emblueuser.com       capacitarte2@emark16.embluejet.com
[account] capacitarte2(twitter):51       [subdomain] emark16(ebay):43   [basedomain] embluejet(mufg):40
20150219000     67.222.5.182    8:7     host.hintzebros.com         hbhosting@host.hintzebros.com
[account] hbhosting(hsbc):40     [subdomain] host(hsbc):50       [basedomain] hintzebros(twitter):47
20150219000     210.155.36.102  0:28    GBCGWY11.g-book.com,GBCGWY12.g-book.com  g-book.info@03-003.mail.g-book.com
[account] g-book.info(blockchain):48     [subdomain] 03-003.mail(e-gold):17       [basedomain] g-book(facebook):54
20150219000     124.39.224.154  2:44    mail.alinez.net  azpop@alinez.net
[account] azpop(apple):60        [subdomain] (taobao):0  [basedomain] alinez(paylife):59
20150219000     193.169.180.59  2:15    mail17-59.srv2.de       return@mail.innogames.com
[account] return(perfectmoney):42        [subdomain] mail(taobao):0    [basedomain] innogames.com
20150219000     219.166.188.250  0:1    wakos.co.jp     sugimoto@wakos.co.jp
[account] sugimoto(outlook):40   [subdomain] (taobao):0  [basedomain] wakos(chase):40
20150219000     174.143.229.157  0:1    mail07.sm.ihg.com        bounces@sm.ihg.com
[account] bounces(payoneer):40   [subdomain] sm(mufg):31 [basedomain] ihg(mufg):28
```

| Type: Account | count: 8 | | | |
|---|---|---|---|---|
| 67.69.168.71 | toroondcmximta02.bellnexxia.net. | 577,CAN,Bell CanadaCA | 127.5.254.14 | 1 | PayPal@intl-paypal.com | toroondcmximta02-srv.bellnexxia.net |
| | toroondcmximta02.srv.bell.ca. | | | | | |
| 85.214.41.253 | h2240674.stratoserver.net. | 6724,DEU,STRATO STRATO AGDE | 127.0.0.32 | 7 | Paypal@service.com | h2240674.stratoserver.net |
| 87.106.148.196 | s476676060.mialojamiento.es. | 8560,DEU,ONEANDONE-AS 1&1 Internet AGDE | 127.5.254.14 | 1 | paypal@support.com | s476676060.mialojamiento.es |
| 94.136.40.98 | winmail.mailcore.me. | 20738,GBR,AS20738 Weblusion Internet SolutionsGB | 127.0.0.32 | 3 | paypal@help.com | winmail.mailcore.me |
| 115.210.41.206 | no-rdns | 4134,CHN,CHINANET-BACKBONE No.31,Jin-rong StreetCN | 127.0.0.32 | 1 | paypal@oyaer.com | multirun-3.hodtasea.com |
| 185.43.209.126 | host126-209-43-185.static.arubacloud.com. | 199883,GBR,ARUBACLOUDLTD-ASN ArubaCloud LimitedGB | 127.5.254.0 | 1 | paypal@contact.fr | wwx |
| 185.43.209.138 | host138-209-43-185.static.arubacloud.com. | 199883,GBR,ARUBACLOUDLTD-ASN ArubaCloud LimitedGB | 127.5.254.14 | 2 | Paypal@epaypal.co.uk | arafloussek |
| 188.213.143.40 | vps-4249.fhnet.fr. | 197922,FRA,FIRSTHEBERG Techcrea Solutions SarlFR | 127.5.254.14 | 7 | paypal.scur@support.intl | vps-4249 |

FIG. 10

| Type: Domain | count: 6 | | | |
|---|---|---|---|---|
| 67.69.168.71 | toroondcmximta02.bellnexxia.net. | 577,CAN,Bell CanadaCA | 127.5.254.14 | 1 | PayPal@intl-paypal.com | toroondcmximta02-srv.bellnexxia.net |
| | toroondcmximta02.srv.bell.ca. | | | | | |
| 119.9.22.104 | no-rdns | 58683,AUS,RACKSPACE-AS Rackspace.com SydneyHK | 127.5.254.14 | 1 | service@npaypal.com | ilyane-19 |
| 159.253.4.59 | vps.web4exposure.nl. | 47869,NLD,NETROUTING-AS NetroutingNL | 127.0.0.32 | 5 | mydebit@paypal.com | root |
| | | | | | DebitPP@pauypal.com | |
| 162.248.244.73 | no-rdns | 31863,USA,Centrilogic Inc.US | 127.0.0.32 | 8 | service@ppaypal.com | sociedadahap.com |
| 185.7.215.135 | no-rdns | 199308,FRA,QUALIT-AS QUALIT S.A.S.FR | 127.5.254.14 | 9 | service@team-paypal.com | WIN-IKID0CS91H |
| 185.43.209.138 | host138-209-43-185.static.arubacloud.com. | 199883,GBR,ARUBACLOUDLTD-ASN ArubaCloud LimitedGB | 127.5.254.14 | 2 | Paypal@epaypal.co.uk | arafloussek |

| Type: Sub Domain | count: 7 | | | |
|---|---|---|---|---|
| 72.47.235.197 | mediosoideas.com. | 31815,USA,Media Temple Inc.US | 127.5.254.14 | 3 | service@paypal.com.styio21.com) | server.mediosoideas.com |
| 96.47.31.222 | paypalprospect.outbound.ed10.com. | 46263,USA,e-Dialog IncUS | 127.3.0.1 | 2 | 1VQHFQ8-4M84-8KKXN-HYPQR8-1K73-M-M2-20150225-1f66b46c951ca8cc67@paypalprospect.bounce.ed10.net MNViMV9-Cl2Q-YVC8-XHZUK6-BEE6-M-M2-20150225-690c9cf71ef61eaa31@paypalprospect.bounce.ed10.net | paypalprospect.outbound.ed10.com |
| 96.47.31.223 | paypalprospect.outbound.ed10.com. | 46263,USA,e-Dialog IncUS | 127.3.0.1 | 5 | I56X26Y-0212-TRGL-MSHMK0-Y42R-M-M2-20150225-08e7f5f00c6c1aba047@paypalprospect.bounce.ed10.net I56X26Y-0212-HRJE-DWR6BQ-WMCS-M-M2-20150225-0ebd4b95f98ec3b527e@paypalprospect.bounce.ed10.net I56X26Y-0212-DQEK-MSHMVW-Y709-M-M2-20150225-1db12a3d277f4Q0b67@paypalprospect.bounce.ed10.net I56X26Y-0212-K3N5-HYPVW6-WMCS-M-M2-20150225-ebbafe65398l3fd2e8@paypalprospect.bounce.ed10.net I56X26Y-0212-SGB1-FF8XPU-6QXT-M-M2-20150225-c4ee6a680030d43a401@paypalprospect.bounce.ed10.net | paypalprospect.outbound.ed10.com |
| 109.237.213.11 | lgarden.nl. | 38930,NLD,FIBERRING FiberRing B.V.NL | 127.1.0.1 | 3 | osgpmau@ssl-paypal-alert-notice.www.tradson.com hgx@sslsecured-paypal-alert.www.f-hha.org a@ssl-paypal-alert-notice.cosvi.com | vps12319.alm.mihosnet.com |
| 185.81.157.174 | no-rdns | 8218,FRA,NEO-ASN Neo Telecoms S.A.S.FR | 127.0.0.32 | 4 | security@paypal.team.com | vps-76236 |
| 192.185.2.104 | tundra.websitewelcome.com. | 20013,USA,CyrusOne LLCUS | 127.1.0.1 | 2 | service_securs@paypal.inc.com | tundra.websitewelcome.com |
| 195.154.51.137 | 195-154-51-137.rev.poneytelcom.eu. | 12876,FRA,AS12876 ONLINE S.A.S.FR | 127.5.254.0 | 2 | support@paypal.info.org | WIN-EESR9SR4HUQ |

| srcIp | destIpSource | subject | sectFrom | realm |
|---|---|---|---|---|
| 12.34.216.74 | 198.58.110.161 | Account Status Update | (1,((Paypal@Service.com))) | [(http://159.253.147.5/~dadyxdflogo/accountsess20136740sess20136740sess201367402sess20136740sess20136740sess2013674020sess201367402sess20136740sess201367402sess201367402sess2013674/update),(https://www.paypal.com)] |
| 205.242.229.67 | 198.58.110.161 | Account Status Update | (1,((Paypal@Service.com))) | [(http://159.253.147.5/~dadyxdflogo/accountsess20136740sess20136740sess201367402sess20136740sess20136740sess2013674020sess201367402sess20136740sess201367402sess201367402sess2013674/update),(https://www.paypal.com)] |
| 12.34.216.74 | 198.74.59.136 | Account Status Update | (1,((Paypal@Service.com))) | [(http://159.253.147.5/~dadyxdflogo/accountsess20136740sess20136740sess201367402sess20136740sess20136740sess2013674020sess201367402sess20136740sess201367402sess201367402sess2013674/update),(https://www.paypal.com)] |
| 205.166.218.67 | 94.136.40.98 | ❖ Re: Your PayPal Account Has Been Limited! Please Update Now ❖ | (1,((paypal@help.com))) | [(http://update.neuro-feedback.irhupdate.php)] |
| 195.83.89.132 | 185.13.205.126 | Votre carte bancaire arrive ❖ expiration. | (1,((paypal@contact.fr))) | [(http://rexabernouska.cz/piece/z)] |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 161.110.13.14 | | Unzustellbar: Receipt for Your Payment to eBay | (2,((postmaster@parliament.gv.al),(service@paypali.com))) | | 161.110.13.15 |
| 218.78.214.42 | | @PP Wednesday, February 18, 2015. Remove PP limitations ! | (1,((DebitPP@paypal.com))) | | 50.121.0.34 |
| 161.110.13.14 | | Unzustellbar: Receipt for Your Payment to eBay | (2,((postmaster@parliament.gv.al),(service@paypali.com))) | | 161.110.13.15 |
| 205.165.218.67 | 193.231.186.131 | Your account has been suspended | (1,((paypal@support.com))) | [(http://www.secure-web-form.com/validate.php)] |

FIG. 16

SYSTEM AND METHOD FOR IDENTIFYING FORGED EMAILS

BACKGROUND OF THE INVENTION

1. Field of the Invention

The present invention relates generally to computer security, and more particularly but not exclusively to methods and systems for detecting forged emails.

2. Description of the Background Art

Forged emails are sent out by cybercriminals to perpetrate cybercrimes, such as phishing. A forged email may have a message body that masquerades as being sent by a legitimate organization (e.g., ecommerce site, online financial service) that is recognized by a potential victim. The forged email may also have a sender email address that is consistent with that of the legitimate organization. The potential victim is thus lured to read the forged email, which may have a link to a malicious server that is operated or compromised by a cybercriminal.

SUMMARY

In one embodiment, forged emails are detected by extracting email address parts of a sender email address. The email address parts may include an account name, a subdomain, and a base domain of the sender email address. The mutation ratio of the email address parts relative to reference strings may be calculated to determine similarity of the email address parts to the reference strings. The mutation ratios may be compared to ratio thresholds to identify suspicious email addresses, and the results of identifying suspicious email addresses may be correlated with other computer security information to identify forged emails.

These and other features of the present invention will be readily apparent to persons of ordinary skill in the art upon reading the entirety of this disclosure, which includes the accompanying drawings and claims.

DESCRIPTION OF THE DRAWINGS

FIGS. 7-16 show example screenshots that illustrate an example operation of detecting forged emails in accordance with an embodiment of the present invention.

Figure 1:
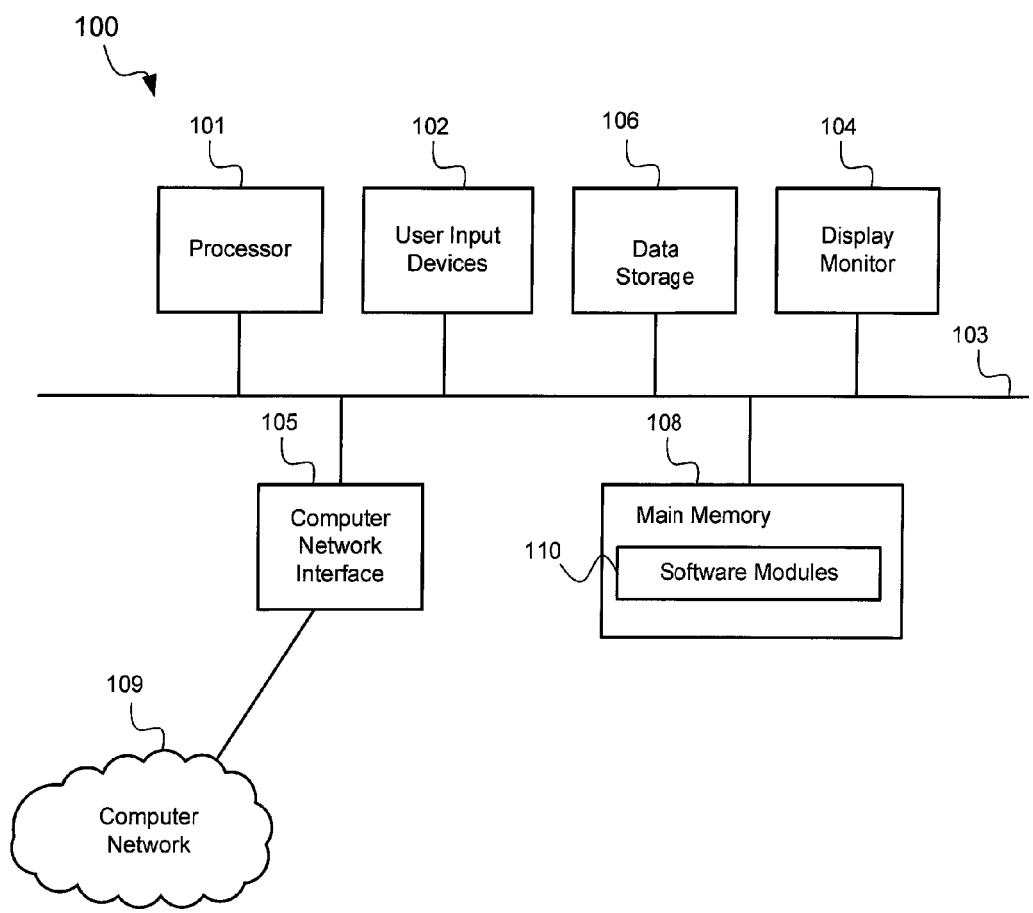
FIG. 1 shows a schematic diagram of a computer that may be employed with embodiments of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software. Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

An email address includes a local part, a domain part, and an "@" sign that separates the local and domain parts. The local part identifies an account name and the domain part identifies a domain name. An account name identifies an email account in an email system with the domain name. A domain name may have a top level domain (e.g., "com", "edu"), base domain, and a subdomain. The top level domain, base domain, and subdomain are separated by a period.

A sender email address identifies the sender of an email. A forged email may have a forged sender email address that looks very similar to a legitimate email address. The domain name of the forged sender email address may be a mutation of the domain name of the legitimate email address. For example, a phishing email may have the following sender and subject information:

From: "Paypal"<no-reply@paypal.com>
Subject: Please Update Your account information!

In the above example, the domain name of the sender email address is "paypal.com", which is very similar to "paypal.com" (the domain name of a legitimate financial service). One can readily see that it is very easy to confuse the legitimate email address with its mutated version.

An authentication scheme may be employed to identify authentic emails (i.e., emails from legitimate organizations that are approved by the email receiver). For example, Sender Authentication Framework (SPF), DomainKeys Identified Mail (DKIM), and Domain-Based Message Authentication, Reporting, and Conformance (DMARC) authentication allow a Mail Transfer Agent (MTA) to identify authentic emails. However, authentication schemes cannot be readily employed to identify mutated domain names. For example, a mutated domain name may have a confusing subdomain (e.g., "paypal.somegood.com") or may have a missing or replaced character in the base domain ("intl.paypl.com"), making it difficult for an authentication scheme to determine whether or not an email has a forged sender email address.

An email reputation service evaluates an email to assign a reputation to the email, such as whether the email is malicious (e.g., email phishing, spam email), is normal (i.e., legitimate), or has an unknown reputation. An email reputation service may assign a bad reputation to an email when the email is linked to a malicious online activity, such as when the email is found to be part of a phishing attack, mass mailing campaign, etc. The malicious online activity of an email may be discovered from honeypots, user feedback, etc. Unfortunately, without knowing that a forged email is related to malicious online activities or without having access to data showing the malicious online activities, the email reputation service will not be able to prove that the email is forged, and accordingly will not be able to assign a bad reputation to the forged email.

Referring now to FIG. 1, there is shown a schematic diagram of a computer 100 that may be employed with embodiments of the present invention. The computer 100 may be employed in a forged email detection system. For example, the computer 100 may be employed as a mail transfer agent (MTA), a security server, and other computers described herein. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a forged email detector when the computer 100 is employed as a mail transfer agent.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
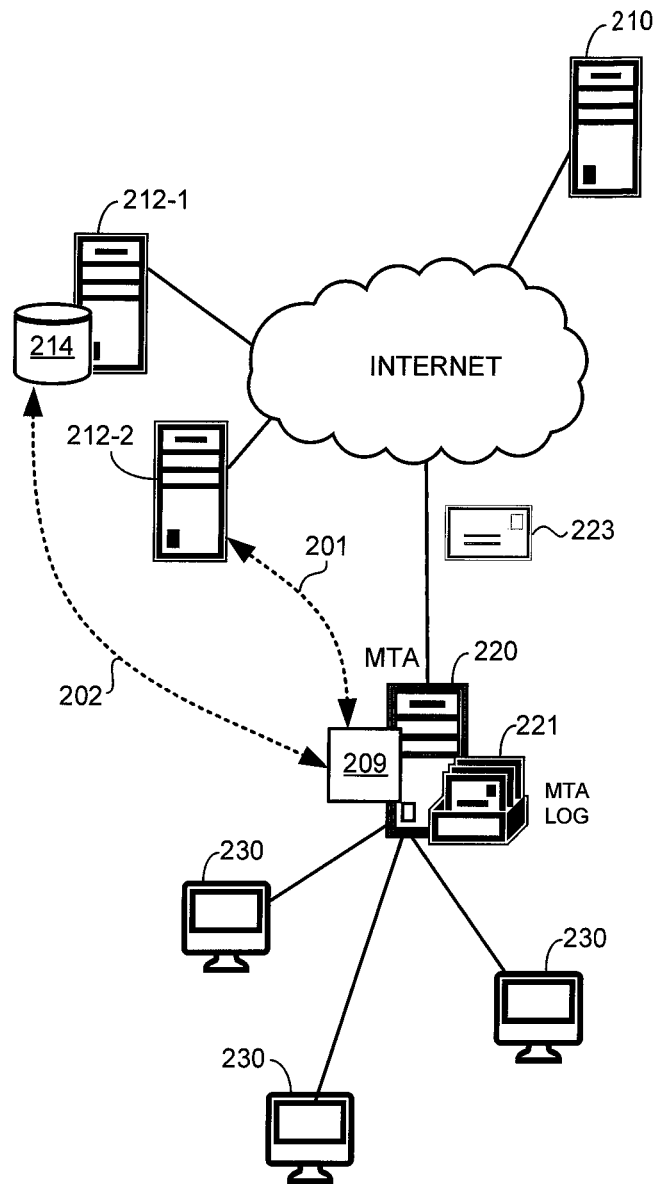
FIG. 2 shows a schematic diagram of a system of detecting forged emails in accordance with an embodiment of the present invention.

FIG. 2 shows a schematic diagram of a system of detecting forged emails in accordance with an embodiment of the present invention. In the example of FIG. 2, the system includes an MTA server 220, one or more servers 212 (i.e., 212-1, 212-2, etc.), and one or more client computers 230. Generally speaking, a server may comprise one or more computers with appropriate server software. Similarly, a client computer may comprise a user computer employed by a user who takes advantage of the service provided by the server. More specifically, the MTA server 220 may comprise one or more computers for providing an email service to a user of a client computer 230. The MTA server 220 may be running an email server software and a client computer 230 may be running a corresponding email client software. The MTA server 220 and the client computers 230 may be part of a private email system of a private computer network of an individual or organization (e.g., business, government, school). The MTA server 220 may receive one or more emails 223 from another MTA server over the Internet, such as from a server 210, and forward the emails 223 to corresponding client computers 230.

The MTA server 220 may be on-premise within a private computer network that includes the client computers 230. The MTA server 220 may also be accessible by the client computers 230 over the Internet. As its name implies, the MTA server 220 serves as a mail transfer agent for an email system that communicates in accordance with the Simple Mail Transfer Protocol (SMTP). As can be appreciated, embodiments of the present invention are not so limited and may be employed on email systems in general.

In the example of FIG. 2, the MTA server 220 performs forged email detection using a forged email detector 209 in conjunction with one or more computer security servers 212. It is to be noted that forged email detection may also be performed outside of the MTA server 220, such as by another computer that hosts a forged email detector 209, for example.

A computer security server 212 may comprise one or more computers that provide an in-the-cloud security service, i.e. over the Internet. A computer security server 212 may provide an email reputation service, a web reputation service, a file reputation service, an antivirus scanning service, and/or other computer security service. In the example of FIG. 2, the computer security server 212-1 hosts a honeypot 214 for obtaining samples of malicious emails, such as spam emails and phishing emails.

In the example of FIG. 2, the MTA server 220 maintains an MTA log 221 that includes information on emails that are received in the MTA server 220, including emails sent and received by the client computers 230. In one embodiment, the MTA server 220 parses the MTA log 221 to identify sender email addresses, extracts email address parts from the sender email addresses, calculates mutation ratios of email address parts relative to reference strings to identify suspicious sender email addresses, and to correlate the identification of suspicious email addresses with other sources of computer security information (e.g., information available from a computer security server 212; see arrows 201 and 202) to identify forged emails.

Figure 3:
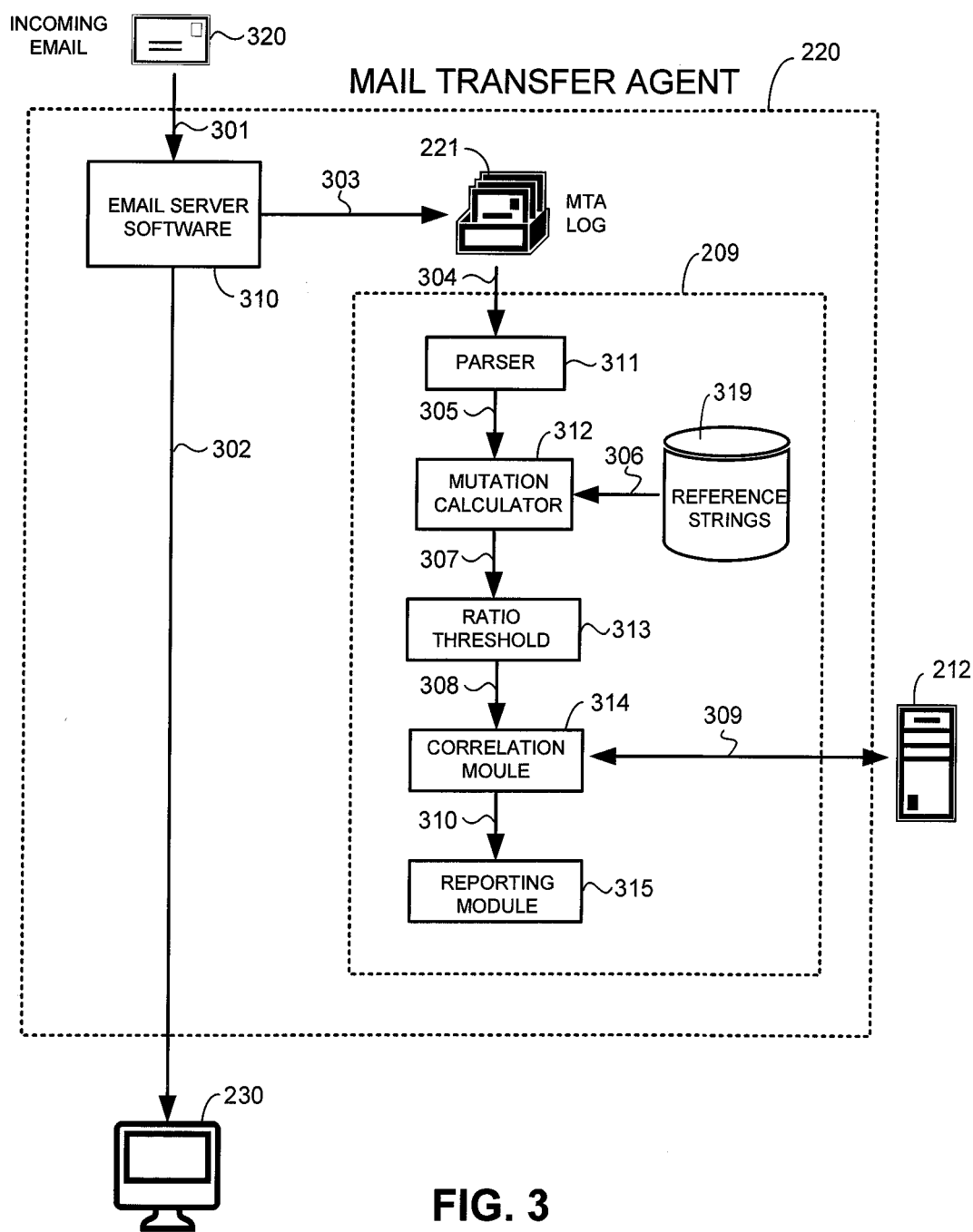
FIG. 3 shows a schematic diagram of a mail transfer agent in accordance with an embodiment of the present invention.

FIG. 3 shows a schematic diagram of the mail transfer agent 220 in accordance with an embodiment of the present invention. In the example of FIG. 3, the mail transfer agent 220 comprises an email server software 310, the MTA log 221, and the forged email detector 209. The email server software 310 may comprise a suitable email server software that provides an MTA service. Depending on the particulars of the email server software 310, the MTA server 220 may include a module (not shown) that interfaces the email software 310 to the MTA log 221. Such a module may, for example, communicate with the email server software 310 to receive information on received emails and write the information onto the MTA log 221. Users of the private email system served by the MTA server 2220 may maintain an email account with the email server software 310.

The MTA log 221 may comprise information on emails received by the MTA server 220. The MTA log 221 may be maintained on a data storage device of the MTA server 220. In the example of FIG. 3, the mail server software 310 writes on the MTA log 221 the Internet Protocol (IP) addresses and email addresses of received emails.

The forged email detector 209 may be implemented as software running on the MTA server 220. The components of the forged email detector 209 may be integrated together or provided as separate modules (e.g., scripts, standalone applications, callable libraries, etc.). In the example of FIG. 3, the forged email detector 209 comprises a parser 311, a mutation calculator 312, a ratio threshold module 313, a correlation module 314, and a reporting module 315.

In the example of FIG. 3, the email server software 310 receives an incoming email 320 (see arrow 301) that is addressed to an email account of a user of a user computer 230. An incoming email is an email that is incoming to the private email system served by the MTA server 220, whereas an outgoing email is an email that is being sent out from the private email system. An incoming email may be received by the MTA server 220 from another MTA server, and an outgoing email may be received from a user computer 230.

A user may use an email client to retrieve the incoming email 320 from the email server software 310 (see arrow 302). The receipt of the incoming email 320 and other emails received in the MTA server 220 is logged onto the MTA log 221 (see arrow 303). In one embodiment, the IP address and email address of the incoming email 320 and other emails received in the MTA server 220 are logged onto the MTA log 221. In one embodiment, the sender email address of an email indicated in the MTA log 221 is the "envelope from" (also referred to as "Mail From") of the email. The MTA log 221 may also store or have references to the entirety of the received emails.

In the example of FIG. 3, the parser 311 parses the MTA log 221 to retrieve the sender IP addresses and sender email addresses of incoming emails (see arrow 304). In one embodiment, the parser 311 aggregates the incoming emails by sender IP address. The parser 311 may also extract a plurality of email address parts from each sender email address. In one embodiment, the parser 311 extracts the account name, the base domain, and the subdomain of each sender email address. As a particular example, given a sender email address "aaa@bbb.ccc.com", the email parser 311 may extract "aaa" as the account name of the sender email address, "bbb" as the subdomain of the sender email address, and "ccc" as the base domain of the sender email address.

In the example of FIG. 3, the mutation calculator 312 receives the email address parts (see arrow 305) and calculates a mutation ratio of each email address part relative to a reference string in a listing 319 (see arrow 306). In one embodiment, the mutation calculator 312 employs a Levenshtein algorithm to calculate mutation ratios. Other suitable edit distance algorithms may also be employed without detracting from the merits of the present invention.

The listing 319 may comprise a database, table, or other suitable listing of strings that are used as references for detecting forged email addresses. In one embodiment, the listing 319 comprises strings of account names and domain names of legitimate email addresses that are typically forged, such as those of well-known sites on the Internet. In the example of FIG. 3, for each sender email address part, the mutation calculator 312 calculates a mutation ratio of the sender email address part relative to a reference string. A mutation ratio is a measure of similarity of two strings. That is, a mutation ratio indicates how similar a given string is to another string. In one embodiment, a mutation ratio has a range that goes from 0 to 100, with 100 indicating that the two strings are identical (i.e., exactly the same) and 0 indicating that the two strings are totally different from each other (no similarity whatsoever). As can be appreciated, the range of the mutation ratio and whether a lower or higher mutation ratio indicates similarity or dissimilarity depend on the particulars of the application.

In the example of FIG. 3, for a given sender email address and a plurality of reference strings, a plurality of account name mutation ratios (MR(A)), a plurality of subdomain mutation ratios (MR(S)), and a plurality of base domain mutation ratios (MR(B)) may be calculated. In one embodiment, the mutation calculator 312 selects the maximum, i.e., highest value, account name mutation ratio among the plurality of account name mutation ratios as the account name mutation ratio of the sender email address. Similarly, the mutation calculator 212 selects the maximum base domain mutation ratio and the maximum subdomain mutation ratio as the base domain mutation ratio and subdomain mutation ratio, respectively, of the sender email address. In that example, there are one account name mutation ratio, one subdomain name mutation ratio, and one base domain mutation ratio per sender email address.

In the example of FIG. 3, the ratio threshold module 313 compares the mutation ratio of each of the email parts of the sender email address to a corresponding ratio threshold to determine if the sender email address is suspicious, i.e., a forged or likely to be a forged email address (see arrow 307). More specifically, the account name mutation ratio of the sender email address is compared to an account name ratio threshold to determine if the account name is very similar to a reference string, indicating that the account name was likely made to masquerade as the reference string. Similarly, the subdomain mutation ratio and the base domain mutation ratio of the sender email address are compared to a subdomain ratio threshold and a base domain ratio threshold, respectively, to determine if the sender email address is suspicious. In one embodiment, an email address with a suspicious sender email address is deemed to be a suspicious email, and an email address with no suspicious sender email address is deemed to be a normal email.

In the example of FIG. 3, if a mutation ratio of any of the email parts of the sender email address indicates that the sender email address is suspicious, the correlation module 314 correlates the results of the ratio threshold module 313 with other computer security information to determine if the email with the suspicious sender email address is a forged email (see arrow 308). Otherwise, if the sender email address does not have an email part with a mutation ratio that indicates the sender email address is suspicious, the sender email address may be deemed to be a normal email address. In some embodiments where correlation is not performed or is unavailable, a suspicious sender email address may be deemed to be a forged email address, and its corresponding sender email may be deemed to be a forged email.

In the example of FIG. 3, the correlation module 214 works in conjunction with one or more computer security servers 212 (see arrow 309) to obtain additional computer security information relating to identified suspicious emails, i.e., emails with suspicious sender email addresses. For example, the correlation module 214 may provide a uniform resource locator (URL) extracted from the suspicious email to a computer security server 212 that provides a web reputation service to get a reputation of the URL. As another example, the correlation module 214 may provide an attachment extracted from the suspicious email to a computer security server 212 that provides a file reputation service to get a reputation of the attachment, and so on. This way, any malicious online activity associated with the suspicious email may be discovered, thus proving that the suspicious email is forged. As can be appreciated, because the malicious online activities associated with an email are found based on the email's sender email address, rather than the other way around, the email can be detected to be forged even when the private email system has no previous encounters with the email.

In the example of FIG. 3, the reporting module 315 reports data relating to the forged email detection process to an administrator (e.g., via email, text message, message box), to a log, etc. so that actions may be taken against the forged email (see arrow 310). The results of the forged email detection process may be employed to generate signatures (e.g., generate one or more patterns from the suspicious email for filtering other emails), graphs and reports for analysis, templates, and/or other computer security-related data.

Figure 4:
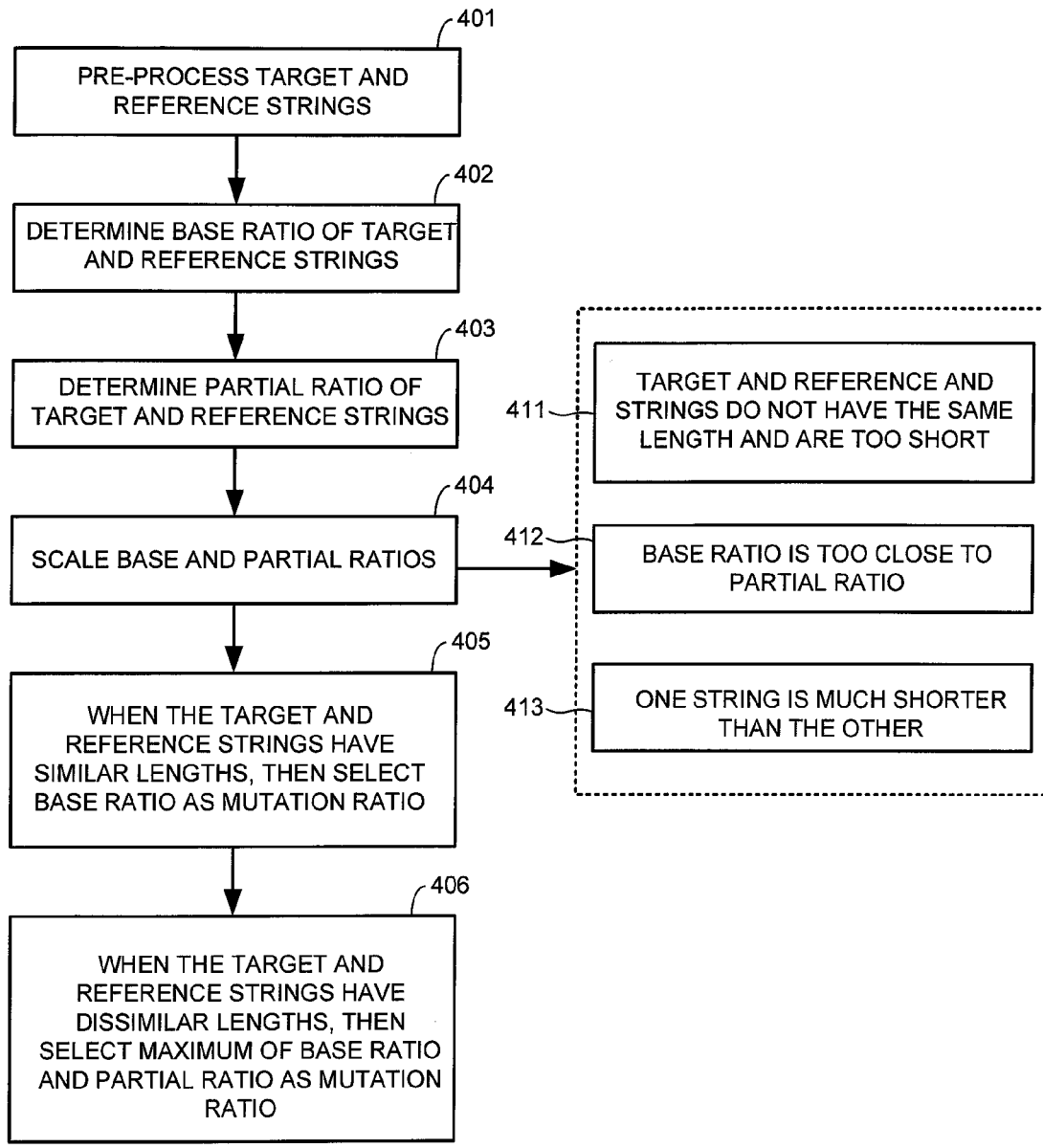
FIG. 4 shows a flow diagram of a method of determining a mutation ratio of a target string and a reference string in accordance with an embodiment of the present invention.

FIG. 4 shows a flow diagram of a method of determining a mutation ratio of a target string and a reference string in accordance with an embodiment of the present invention. In one embodiment, the target string is an email address part of a sender email address being evaluated (also referred to as "target sender email address") and the reference string is a string associated with a legitimate email address. The method of FIG. 4 may be performed by or in conjunction with the mutation calculator 312, for example.

In the example of FIG. 4, the target and reference strings are pre-processed to convert them to a format that expedites mutation ratio calculation (step 401). The target and reference strings may be pre-processed by removing white spaces, converting all characters to lower case, removing stop words, encoding, etc. Preferably, each of the target and reference strings has 20 characters or less.

The base ratio of the target string and the reference string is determined (step 402). In one embodiment, the base ratio of the target and reference strings is calculated using the Levenshtein algorithm. The base ratio may have a range of 0-100, with zero indicating that there is no similarity between the target and reference strings and 100 indicating that the target and reference strings are identical. As a particular example, the base ratio of "trendmicro" (a string of a base domain of a legitimate email address) relative to "trendnicro" (a string of a forged base domain) may be represented as baseratio("trendmicro", "trendnicro")=90 where "baseratio( )" is a function that performs the Levenshtein algorithm. The base ratio of 90 in the above example indicates that "trendmicro" and "trendnicro" are very similar.

The partial ratio of the target and reference strings is determined (step 403). In one embodiment, the partial ratio of a target string and a reference string is calculated by assigning the shorter of the reference and target strings as a base string, truncating the longer of the target and reference strings into a fixed length truncated string, shifting the longer of the target and reference strings to generate a plurality of fixed length truncated strings, calculating the base ratio of the base string relative to each of the plurality of fixed length truncated strings, and selecting the maximum base ratio as the partial ratio of the target and reference strings. Calculation of partial ratios is further explained below with reference to FIG. 5.

Continuing with FIG. 4, the base ratio and the partial ratio of the target and reference strings may be scaled to compensate for situations where the resulting mutation ratio may not be reliable (step 404). The scaling of the base ratio and the partial ratio may be performed under certain conditions, such as when the reference and target strings do not have the same length and are too short (see 411), when the base ratio is very close to the partial ratio (see 412), or when one string is much shorter than the other (see 413).

A base scale (base_scale) may be designated for scaling a base ratio (base_ratio), and a partial scale (partial_scale) may be designated for scaling a partial ratio (partial_ratio). The base scale and partial scale may be in terms of percent, for example. The base and partial scales may be from 0.0 to 1.0, with 1.0 indicating no scaling (i.e., 100%). The scaled base ratio may be equal to the base ratio times the base scale (i.e., base_ratio*base_scale). The scaled partial ratio may be equal to the partial ratio times the partial scale times the base scale (i.e., partial_ratio*partial_scale*base_scale).

The base scale may be adjusted when the target and reference strings do not have the same lengths and are both too short (see 411). The partial scale may be adjusted when the base ratio and the partial ratio are very close or identical (see 412). As a particular example, when both the base ratio and the partial ratio are equal to 90, the partial scale may be adjusted from 1.0 to 0.9. This scaling puts more emphasis on the base ratio for determining the mutation ratio. The partial scale may be adjusted when one string is much shorter than the other (see 413).

When the target string and reference string have the same or similar lengths, the scaled base ratio may be designated as the mutation ratio of the target and reference strings (step 405).

When the target and reference strings do not have similar lengths, the maximum of the scaled base ratio and scaled partial ratio may be designated as the mutation ratio of the target and reference strings (step 406).

Figure 5:
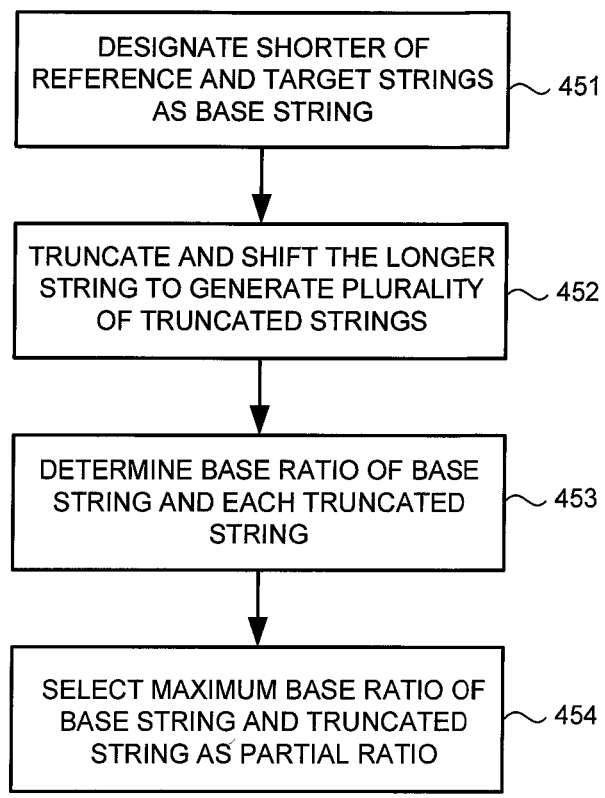
FIG. 5 shows a flow diagram of a method of determining a partial ratio of a target string and a reference string in accordance with an embodiment of the present invention.

FIG. 5 shows a flow diagram of a method of determining a partial ratio of a target string and a reference string in accordance with an embodiment of the present invention. The method of FIG. 5 may be employed in the method of FIG. 4 in determining partial ratios (see FIG. 4, step 403).

In the example of FIG. 5, the shorter of the target and reference strings is designated as a base string (step 451). More particularly, the target string is designated as the base string when the target string is shorter than the reference string, and the reference string is designated as the base string when the reference string is shorter than the target string. The longer of the target and reference strings is truncated and shifted to generate a plurality of truncated strings (step 452). For example, the longer string may be truncated to the same length as the base string. In one embodiment, the longer string is truncated to a shorter fixed-length string, and the longer string is shifted to generate a plurality of truncated versions of the longer string. This is similar to shifting the longer string through a fixed-length register to generate a plurality of register values representing the truncated and shifted longer string. The base ratio of the base string relative to each of the plurality of truncated versions of the longer string is calculated to generate a plurality of base ratios (step 453), and the maximum base ratio is selected as the partial ratio of the target string and the reference string (step 454).

As a particular example, given two strings "trendmicro" (a reference string) and "inthiscasethisistrendnicro" (a target string), the base ratio of the given strings may be represented as baseratio("trendmicro", "inthiscasethisistrendnicro")=50 using the Levenshtein algorithm. The base ratio of 50 indicates that the given strings are dissimilar, which is misleading because "trendmicro" is somewhat present in "inthiscasethisistrendnicro". The partial ratio of the given strings may be calculated by designating "trendmicro" as the base string because it is shorter than "inthiscasethisistrendnicro". Then, "inthiscasethisistrendnicro" may be truncated to the same length as "trendmicro" and the base ratio of "trendmicro" relative to the truncated, shifted versions of "inthiscasethisistrendnicro" are calculated. That is, the calculation of base ratio is repeated for each truncated, shifted version of "inthiscasethisistrendnicro". For example, baseratio("trendmicro", "inthiscase")=20
baseratio("trendmicro", "nthiscaset")=20
baseratio("trendmicro", "thiscaseth")=20
baseratio("trendmicro", "hiscasethi")=20

...
..
.
...
baseratio("trendmicro", "thisistren")=40
baseratio("trendmicro", "hisistrend")=50
baseratio("trendmicro", "isistrendn")=50
baseratio("trendmicro", "istrendnic")=70
baseratio("trendmicro", "strendnicr")=80
baseratio("trendmicro", "trendnicro")=90

The maximum of the base ratios, which is "90", is selected as the mutation ratio of "trendmicro" and "inthiscasethisistrendnicro".

As can be appreciated, the method of determining a mutation ratio of two strings described herein may be applied not just to sender email addresses, but also to other portions of an SMTP transaction. For example, a mutation ratio of strings that are part of an SMTP HELO command may be determined to detect forged strings.

Figure 6:
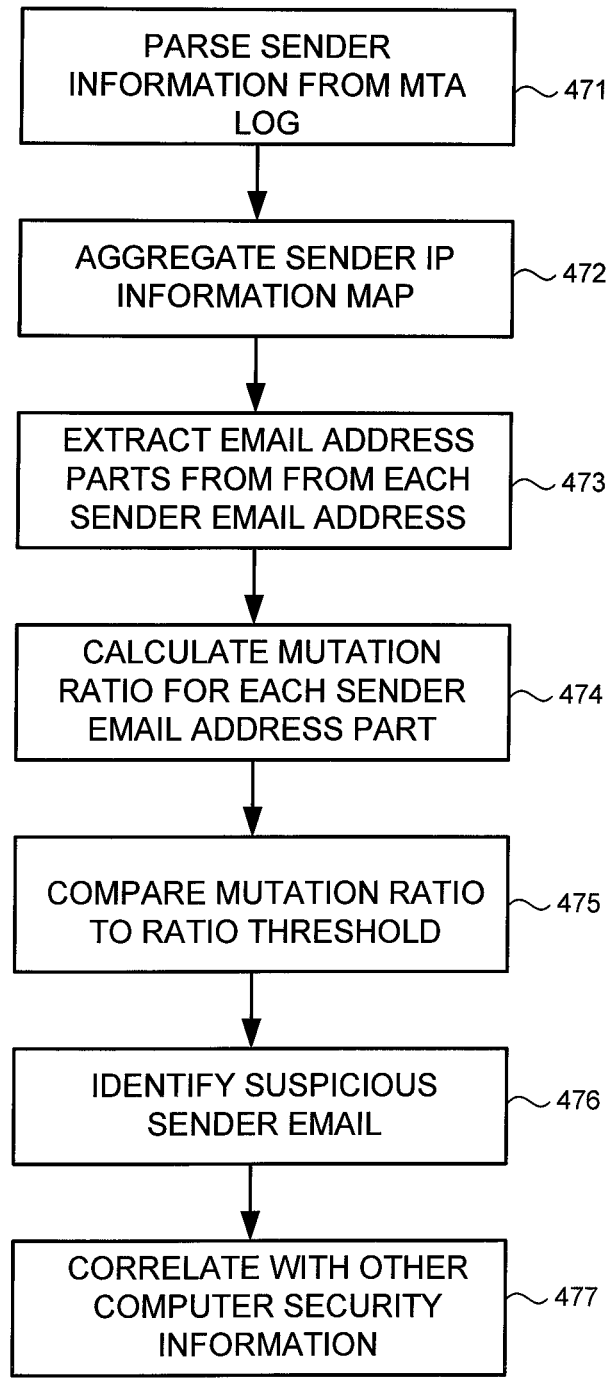
FIG. 6 shows a flow diagram of a method of detecting a forged email in accordance with an embodiment of the present invention.

FIG. 6 shows a flow diagram of a method of detecting a forged email in accordance with an embodiment of the present invention. The method of FIG. 6 may be performed by the MTA server 220 or other computers that are configured to detect forged emails.

In the example of FIG. 6, the MTA log 221 is parsed for sender information (step 471). Sender information may be retrieved from incoming emails received in the MTA server 220. Sender information may include the IP addresses and sender email addresses of the incoming emails. The sender information may be aggregated by IP address (step 472). That is, sender information for the same IP address may be aggregated together, indicating one or more sender email addresses with the same sender IP address.

Email address parts are extracted from each sender email address (step 473). In one embodiment, an account name, a subdomain, and a base the main are extracted from a sender email address. A mutation ratio is determined for each email address part of a sender email address (step 474). A mutation ratio may be determined for an account name, a subdomain, and base domain of a sender email address. That is, a sender email address may have an account name mutation ratio, a subdomain mutation ratio, and a base domain mutation ratio.

The mutation ratios of the email address parts are compared to ratio thresholds to identify suspicious email addresses (step 475). The email address parts may be compared to corresponding ratio thresholds. For example, the ratio thresholds may be A: upper bound 100(exactly match) lower bound 85 and MR(B)!=100

S: upper bound 100(exactly match) lower bound 85

B: upper bound 99(exclude exactly match) lower bound 85 where A is an account name ratio threshold, S is a subdomain ratio threshold, B is a base domain ratio threshold and MR(B) is the mutation ratio of the base domain. In the just-mentioned example, a sender email address with an account name mutation ratio between 85 and 100 and having a base domain mutation ratio that is not 100 meets the account name ratio threshold requirement, and is thus a suspicious sender email address. Similarly, a sender email address with a subdomain mutation ratio between 85 and 100 meets the subdomain ratio threshold requirement and is thus a suspicious sender email address. Also, a sender email address is a suspicious email address when it has a base domain mutation ratio between 85 and 99. Note that a base domain mutation ratio of 100 indicates that the base domain of the sender email address is identical to a reference string, meaning the sender email address is not forged. An email with a suspicious sender email address may be deemed to be a suspicious email (step 476). Other computer security resources, such as a web reputation service, an email reputation service, a file reputation service, etc., may be consulted to correlate the identification of the suspicious email address with other computer security information (step 477).

FIGS. 7-16 show example screenshots that illustrate an example operation of detecting forged emails in accordance with an embodiment of the present invention. In the example operation, periodically (e.g., on an hourly basis), sender information is parsed from the MTA log 221. FIG. 7 shows example parsed sender information as aggregated by sender IP address. As shown in FIG. 7, more than one sender email address may be sent from a single sender IP address. Aggregating the sender email addresses by sender IP address readily reveals related sender email addresses. Email address parts comprising an account name, a subdomain, and a base domain are extracted from each sender email address.

FIG. 8 shows example mutation ratios of various email parts of sender email addresses. The second row of FIG. 8 shows that for the sender email address "Paypal@intl-paypal.com" sent from an IP address "67.69.168.71", the mutation ratio of the account name "Paypal" and reference string "paypal" is 100 (i.e., exact match), the mutation ratio of the subdomain is 0 (no subdomain), and the mutation ratio of the base domain "intl-paypal" and reference string "paypal" is 90 (i.e., very similar). The mutation ratios are compared to ratio thresholds to identify suspicious sender email addresses. FIG. 9 shows an example report that lists identified suspicious sender email addresses by account name, i.e., sender email addresses that are suspicious because their account name has a mutation ratio that meets or exceeds an account name ratio threshold. Similarly, FIG. 10 shows an example report that shows identified suspicious sender email addresses by base domain, and FIG. 11 shows an example report that shows identified suspicious sender email addresses by subdomain. Note that the sender email address "Paypal@intl-paypal.com" is very suspicious because both of its account name and base domain are very similar to the reference string "paypal".

Figure 12:
Figure 13:
Figure 14:
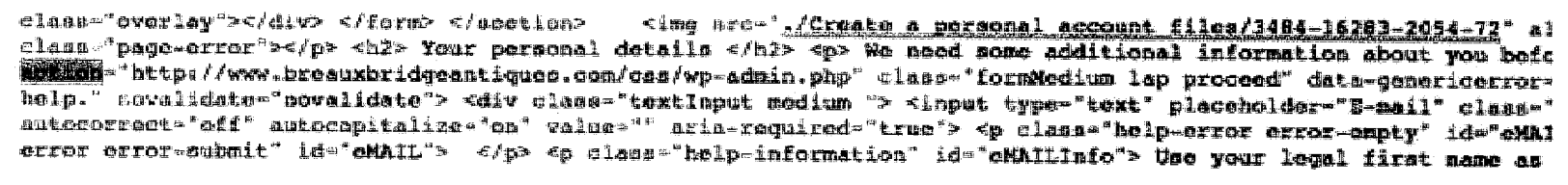

Continuing the example operation, the results of identifying suspicious sender email addresses are correlated with other sources of computer security information. For example, the message body and attachment of the email with the sender email address "Paypal@intl-paypal.com" may be compared to those of emails received in the honeypot 214 (see FIG. 2). FIG. 12 shows a message body of the email with the sender email address "Paypal@intl-paypal.com". Another email (not necessarily from the same sender email address) received in the honeypot 214 has the same message body. FIG. 13 shows the resulting web form that is displayed when the HTML attachment of the message body is activated, and FIG. 14 shows the HMTL code of the web form. The HTML code reveals that the web form includes a port action to a site other than "paypal," indicating that the email is a forged email, i.e., pretending to be sent from "paypal" but is not. URLs and other information may be extracted from the forged email to identify other forged emails and/or other malicious online activities.

Figure 15:
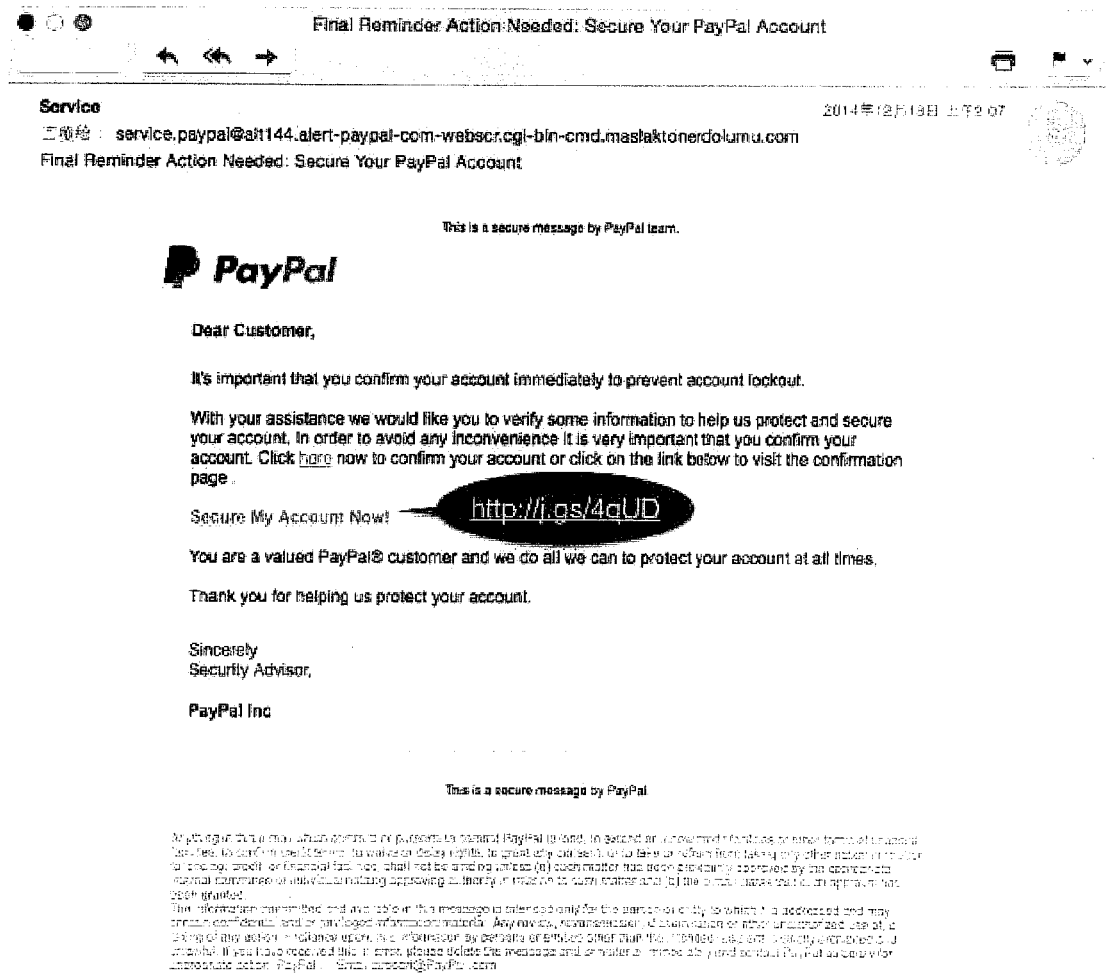

FIG. 15 shows a message body of another suspicious email. The message body includes a URL that is identified as a phishing URL by consulting a web reputation service. The suspicious email is thus confirmed as a forged email. In general, URLs, header information, and attachments of forged emails may be employed as templates or signatures to identify malicious online activities. Data obtained from identifying forged email addresses may also be correlated with other sources of computer security information to identify emails with subject, attachment name, URLs, sender IP addresses, and other sender information that is similar to those of forged email addresses. For example, FIG. 16 shows suspicious sender email addresses with the string "paypal" being correlated with a feedback log of the TREND MICRO SNP security network.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting forged emails, the method comprising:
   receiving a sender email in a first computer, the sender email being addressed to a user of a private computer network;
   extracting a plurality of email address parts from a sender email address of the sender email;
   determining a first mutation ratio of a first email address part of the sender email address relative to a first reference string, the first mutation ratio being a measure of a degree of similarity of the first email address part to the first reference string;
   comparing the first mutation ratio to a first ratio threshold;
   when the first mutation ratio indicates that the first email address part is not identical to the first reference string and the first mutation ratio is above the first ratio threshold, identifying the sender email address as a suspicious email address based on a result of comparing the first mutation ratio to the first ratio threshold;
   when the first mutation ratio indicates that the first email address part is not identical to the first reference string and the first mutation ratio is below the first ratio threshold, identifying the sender email as a normal email that is allowed into the private computer network, and
   after deeming the sender email address to be the suspicious email address, consulting a first computer security server to obtain a computer security information that identifies the sender email as a forged email.

2. The method of claim 1, further comprising:
   determining a second mutation ratio of a second email address part of the sender email address relative to a second reference string, the second mutation ratio being a measure of degree of similarity of the second email address part to the second reference string;
   comparing the second mutation ratio to a second ratio threshold; and
   identifying the sender email address as the suspicious email address based on a result of comparing the second mutation ratio to the second ratio threshold.

3. The method of claim 2, wherein the first email address part comprises an account name of the sender email address and the second email address part comprises a base domain of the sender email address.

4. The method of claim 3, further comprising:
   determining a third mutation ratio of a third email address part of the sender email address relative to a third reference string, the third mutation ratio being a measure of degree of similarity of the third email address part to the third reference string;
   comparing the third mutation ratio to a third ratio threshold; and
   identifying the sender email address as the suspicious email address based on a result of comparing the third mutation ratio to the third ratio threshold.

5. The method of claim 4, wherein the third email address part comprises a subdomain of the sender email address.

6. The method of claim 1, wherein the first email address part comprises an account name of the sender email address and the first computer security server hosts a honeypot that includes another email with a same content as the sender email.

7. The method of claim 1, wherein the first computer is a mail transfer agent (MTA) of the private computer network.

8. A system comprising:
   a storage device comprising a log of emails of a private computer network;
   a first server computer that serves as a mail transfer agent of the private computer network, retrieves from the log of emails a sender email address of a sender email, extracts a first email address part from the sender email address, determines a first mutation ratio of the first email address part relative to a first reference string to determine a degree of similarity of the first email address part to the first reference string, compares the first mutation ratio to a first ratio threshold, identifies the sender email address as a suspicious email address based on a result of comparing the first mutation ratio to the first ratio threshold when the first mutation ratio indicates that the first email address part is not identical to the first reference string and the first mutation ratio is above the first ratio threshold, identifies the sender email as a normal email that is allowed into the private computer network when the first mutation ratio indicates that the first email address part is not identical to the first reference string and the first mutation ratio is below the first ratio threshold, and consults a second server computer to obtain a computer security information that identifies the sender email as a forged email after identifying the sender email address as the suspicious email address; and
   the second server computer in communication with the first server computer to correlate identification of the sender email address as the suspicious email address with another computer security information to identify the sender email as the forged email.

9. The system of claim 8, wherein the second server computer comprises a honeypot that includes another email with a same content as the sender email.

10. The system of claim 8, wherein the first email address part comprises an account name of the sender email address.

11. The system of claim 8, wherein the first email address part comprises a base domain of the sender email address.

12. The system of claim 8, wherein the first email address part comprises a subdomain of the sender email address.

13. The system of claim 8, wherein the first server computer extracts a second email address part from the sender email address, determines a second mutation ratio of the second email address part relative to a second reference string to determine a degree of similarity of the second email address part to the second reference string, compares the second mutation ratio to a second ratio threshold, and identifies the sender email address as the suspicious email address based on a result of comparing the second mutation ratio to the second ratio threshold.

14. The system of claim 13, wherein the first email address part comprises an account name of the sender email address and the second email address part comprises a base domain of the sender email address.

15. A non-transitory computer-readable medium comprising instructions stored thereon, that when executed by a processor, perform the steps of:
- parsing a sender email address of a sender email to identify a first email address part of the sender email address;
- determining a first mutation ratio of the first email address part of the sender email address relative to a first reference string, the first mutation ratio being a measure of a degree of similarity of the first email address part to the first reference string;
- comparing the first mutation ratio to a first ratio threshold to determine if the sender email address is a forged email address;
- when the first mutation ratio is above the first ratio threshold and the first email address part is not identical to the first reference string, identifying the sender email address as the forged email address;
- when the first mutation ratio is below the first ratio threshold and the first email address part is not identical to the first reference string, identifying the sender email as a normal email that is allowed into a computer network; and
- consulting a first computer security server to obtain a computer security information that identifies the sender email as a forged email.

16. The non-transitory computer-readable medium of claim 15, wherein the first email address part comprises a base domain of the sender email address.

17. The non-transitory computer-readable medium of claim 15, wherein the instructions further perforin the steps of:
- parsing the sender email address of the sender email to identify a second email address part of the sender email address;
- determining a second mutation ratio of the second email address part of the sender email address relative to a second reference string, the second mutation ratio being a measure of degree of similarity of the second email address part to the second reference string; and
- comparing the second mutation ratio to a second ratio threshold to determine if the sender email address is the forged email address.

18. The non-transitory computer-readable medium of claim 17, wherein the first email address part comprises an account name of the sender email address and the second email address part comprises a base domain of the sender email address.

* * * * *